(12) United States Patent
Galstian

(10) Patent No.: US 6,180,940 B1
(45) Date of Patent: *Jan. 30, 2001

(54) LIGHT-DRIVEN MOLECULAR ROTATIONAL MOTOR

(75) Inventor: Tigran Galstian, Ste-Foy (CA)

(73) Assignee: Universite Laval, Ste-Foy (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/055,745

(22) Filed: Apr. 7, 1998

(51) Int. Cl.$^7$ .................................................. H05H 3/04

(52) U.S. Cl. ............................................... 250/251
(58) Field of Search .............................................. 250/251

(56) References Cited

U.S. PATENT DOCUMENTS

| | | | |
|---|---|---|---|
| 3,710,279 | 1/1973 | Ashkin | 331/94.5 |
| 3,808,550 | 4/1974 | Ashkin | 331/94.5 |
| 4,092,535 | 5/1978 | Ashkin et al. | 250/251 |
| 4,887,721 | 12/1989 | Martin et al. | 209/579 |
| 4,893,886 | 1/1990 | Ashkin et al. | 350/1.1 |
| 5,079,169 | 1/1992 | Chu et al. | 436/172 |
| 5,170,890 | 12/1992 | Wilson et al. | 209/301 |
| 5,206,504 | 4/1993 | Sridharan | 250/251 |
| 5,212,382 | 5/1993 | Sasaki et al. | 250/251 |
| 5,308,976 | 5/1994 | Misawa et al. | 250/251 |
| 5,363,190 | 11/1994 | Inaba et al. | 356/337 |
| 5,495,105 | 2/1996 | Nishimura et al. | 250/251 |
| 5,512,745 | 4/1996 | Finer et al. | 250/251 |
| 5,528,028 | 6/1996 | Chu et al. | 250/251 |

OTHER PUBLICATIONS

Physical Review Letters, Vo. 78, No. 14, Apr. 7, 1997 entitled Light–Driven Molecular Motor, T.V. Galstian and V. Drnoyan, Center for Optics, Photonics and Laser, Physics Dept., Laval University, Pav. A. Vachon, Cité Universitaire, Quebec, Canada.

Optical Engineering reports, No. 162, p. 1, Jun. 1997 (Interview with Tigran Galstian, Center for Optics Photonics and Lasers, Laval University.

Physical Review, Vol. 50, May 8, 1936, "Technical Detection and Measurement of the Angular Momentum of Light" by Richard A. Beth, pp. 115–125.

Physical Review Letters, Vol. 57, No. 19, Nov. 10, 1986, "Collective Rotation of Molecules Driven by the Angular Momentum of Light in a Nematic Film" by E. Santamato, pp. 2423–2426.

Journal of Modern Optics, 1995, Vol. 42, No. 1, "Optical Particle Trapping with Higher–Order Doughnut Beams Produced Using High Effciency Computers Generated Holograms" by N.R. Heckenberg and H. Rubinsztein–Dunlop, pp. 217–223.

Journal of Modern Optics, 1996, "Optical Tweezers and Optical Scanner with Laguerre–Gaussian Modes" by N.B. Simpson, L. Allen and M.J. Padgett. pp.2485–2491.

Physical Review A, Vol. 54, No. 2, Aug 1996, "Optical Angular–Momentum Transfer to Trapped Absorbing Particles" by M.E.J. Friese, J. Enger, H. Rubinsztein–Dunlop and N.R. Heckenberg, pp.1593–1596.

Friese et al., "Optical angular–momentum transfer to trapped absorbing particles", Physical Review A, vol. 54, No. 2, Aug. 1996, pp. 1593–1596.*

(List continued on next page.)

Primary Examiner—Jack Berman
(74) Attorney, Agent, or Firm—James Anglehart Swabey Ogilvy Renault

(57) ABSTRACT

By adjusting a state of circular polarization of a laser beam, a rate of rotation in micro objects rotated by angular momentum imparted from the light is controlled. The light has greatest effect on anisotropic transparent micro objects. A micro mixer using anisotropic micro probe objects can also be provided by using the light to control rotation of the probe objects in a suspension or solution.

10 Claims, 3 Drawing Sheets

OTHER PUBLICATIONS

He et al., "optical particle trapping with higher–order doughnut beams produced using high efficiency computer generated holograms", Journal of Modern Optics, vol. 42, No. 1, 1995, pp. 217–223.*

Simpson et al., "Optic tweezers and optical spanners with Laguerre–Gaussian modes", Journal of Modern Optics, vol. 43, 1996, pp. 2485–2491.*

* cited by examiner

LIGHT-DRIVEN MOLECULAR ROTATIONAL MOTOR

FIELD OF THE INVENTION

The present invention relates to a method and apparatus for rotating molecular-sized objects using light. The invention also relates to an optical micro-mixer.

BACKGROUND OF THE INVENTION

In biotechnology and other high tech industries, micro particle manipulation is of increasing importance. Cellular and molecular manipulation is difficult, if not impossible in certain circumstances, when using physical instruments.

It is known in the art that electromagnetic gradient forces (EMGF) can be used to trap micro particles and cause translational motion. Various techniques are also known for carrying out optical rotation of micro particles. Trapping and/or rotation of micro particles is known from U.S. Pat. No. 5,363,190 to Inaba et al., U.S. Pat. No. 5,170,890 to Wilson et al., U.S. Pat. Nos. 3,710,279, 3,808,550, 4,092,535, and 4,893,886 to Ashkin et al., U.S. Pat. No. 4,887,721 to Martin et al., U.S. Pat. No. 5,079,169 and U.S. Pat. No. 5,528,028 to Chu et al., U.S. Pat. No. 5,206,504 to Sridharan, U.S. Pat. No. 5,308,976 to Misawa et al., U.S. Pat. No. 5,495,105 to Nishimura et al., U.S. Pat. No. 5,512,745 to Finer et al., and U.S. Pat. No. 5,212,382 to Sasaki et al.

In the prior art, rotation of the micro particles is not carried out using the angular momentum of light.

SUMMARY OF THE INVENTION

Use of the angular momentum of light to rotate micro objects has been published by the inventor of the present application in Physical Review Letters, vol. 78, No. 14, p.2760, Apr. 7, 1997, and in Optical Engineering Reports, No. 162, p.1, June 1997. Circularly polarized light has been found to transfer angular momentum to micro particles. Control over the direction and amount of angular momentum imparted is possible.

According to the invention, there is provided a method of rotating a transparent anisotropic micro object comprising the steps of providing a container containing at least one transparent anisotropic micro object to be rotated, providing a beam of circularly polarized light, directing and controlling the beam to cause rotation of the micro object in the container.

According to the invention, there is also provided a method of micro-mixing a suspension or solution, comprising the steps of providing a container containing the suspension or solution, providing at least one transparent anisotropic micro probe object in the suspension or solution, providing a beam of circularly polarized light, directing and controlling the beam to cause rotation of the micro probe object in the container to induce mixing of the suspension or solution.

The circularly polarized light beam may have both S and L, namely spin and orbital angular momentum, components. The method and apparatus can also be used for absorbing objects, however, the efficiency of transfer of the S component is greatly reduced.

BRIEF DESCRIPTION OF THE DRAWINGS

The invention will be better understood by way of the following description of a preferred embodiment of the invention with reference to the appended drawings, in which.

DETAILED DESCRIPTION OF THE PREFERRED EMBODIMENT

Figure 1:
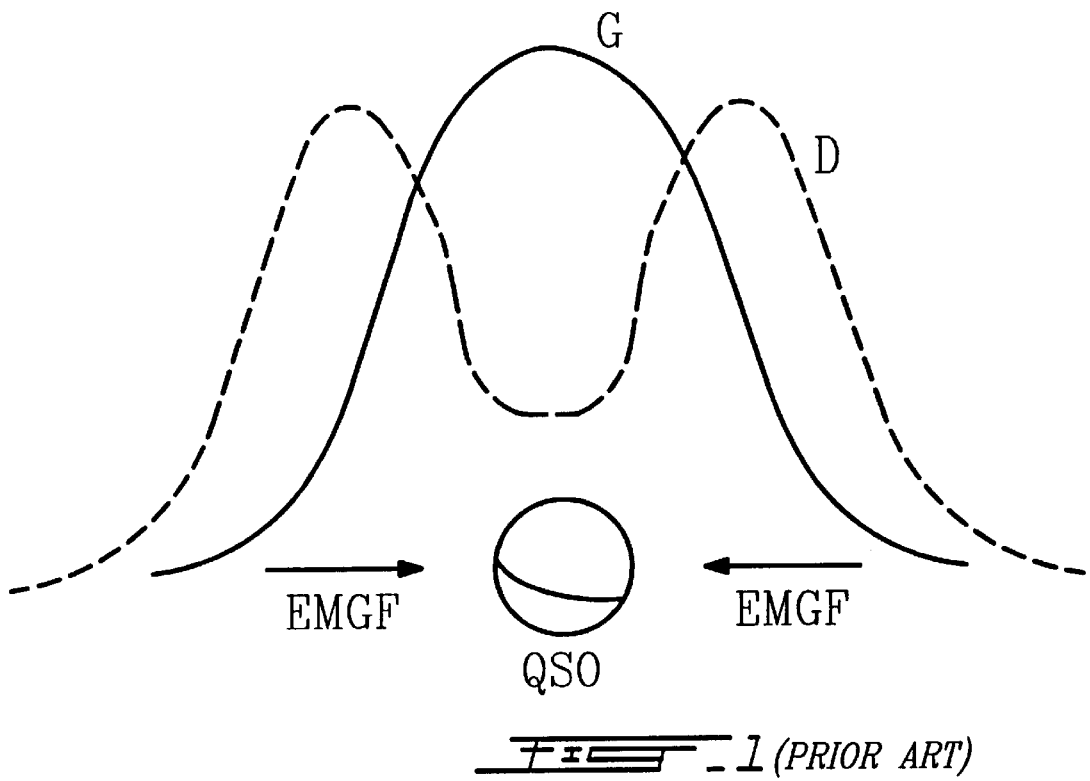
FIG. 1 illustrates a beam intensity distribution of a single beam with Gaussian intensity distribution (G-solid line) and a specially deformed beam (D-dashed line)

FIG. 1 illustrates two types of beam intensity cross-sections of optical beams used to trap micro particles of various origins and manipulate their spatial position. Localization, shift and lifting of micro particles has been demonstrated experimentally using such beam shapes. These manipulations are mainly based on the use of the electromagnetic gradient forces (EMGF). Depending upon the character of the micro object and its environment, one can use a single beam with a Gaussian intensity distribution (the solid line labeled G shown in FIG. 1) or specially deformed (the dashed line labeled D shown in FIG. 1) beams may be used for carrying out this type of localization. The objects manipulated with such beams have mainly been quasi-spherical absorbing or transparent objects (QSO).

In the present invention, angular momentum present in the light beam is transferred to the micro particles for the purposes of rotating the micro particles about the optical axis of the light beam. Both quantum and electromagnetic theories of light predict the existence of the angular momentum of light (or photon spin) S and the possibility of its transfer to matter. Complex electromagnetic fields such as higher order Laguerre-Guassian beams, which may be obtained, for example, by computer generated holograms (CGH), may carry in addition an "orbital" angular moment L associated with the fields spatial non-uniformity. These angular momenta may be transferred to matter when the light is traversing it or when the light is absorbed by the matter. In the general case, the torque T exerted by absorbed light has contributions from both momenta S and L and may be represented as $T=(P_a/\omega)(1+\sigma)$, where $P_a$ is the absorbed power, $\omega$ is the light frequency, 1 is the azimuthal index (or charge) of the beam, and sigma $\sigma$ is 0 for linear polarization and $\sigma$ is + or −1 for circular polarizations.

Figure 2:
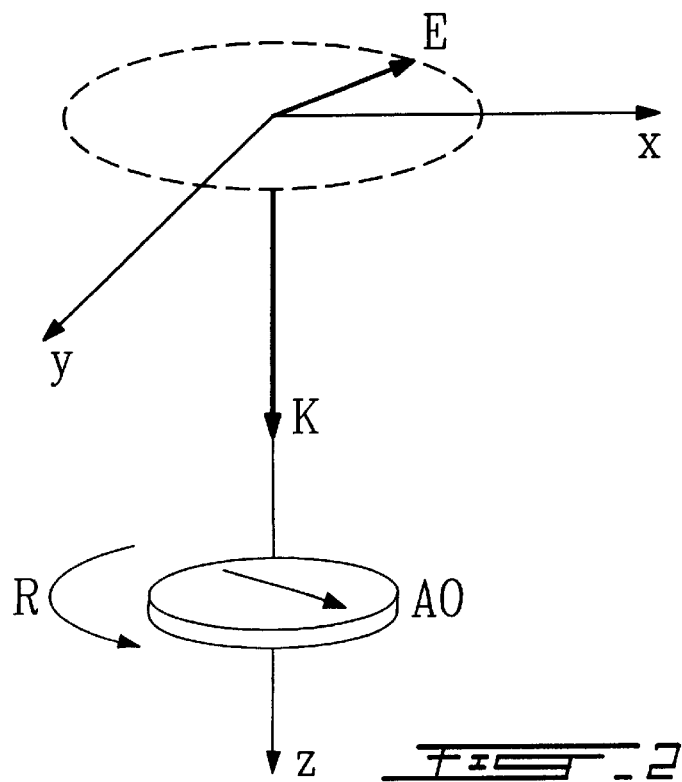
FIG. 2 illustrates the interaction between a transparent and isotropic object (AO) and a light beam having a wave vector (K) with an electric field vector component E causing a rotation in the anisotropic object with a rotation rate R.

As illustrated in FIG. 2, an anisotropic object (AO) may be rotated at a rotation rate R when subjected to a polarized light beam having a wave vector K. When the micro object AO is a half wave plate ($\lambda/2$), this provides the best condition for rotation since it inverts the sign of circularity of polarization when the photons traverse it. An amount of $h/\pi$ rotation momentum is transferred to the half wave plate at each passage. This transfer leads to the rotation of the half wave plate around the wave vector K of the light.

Figure 3:
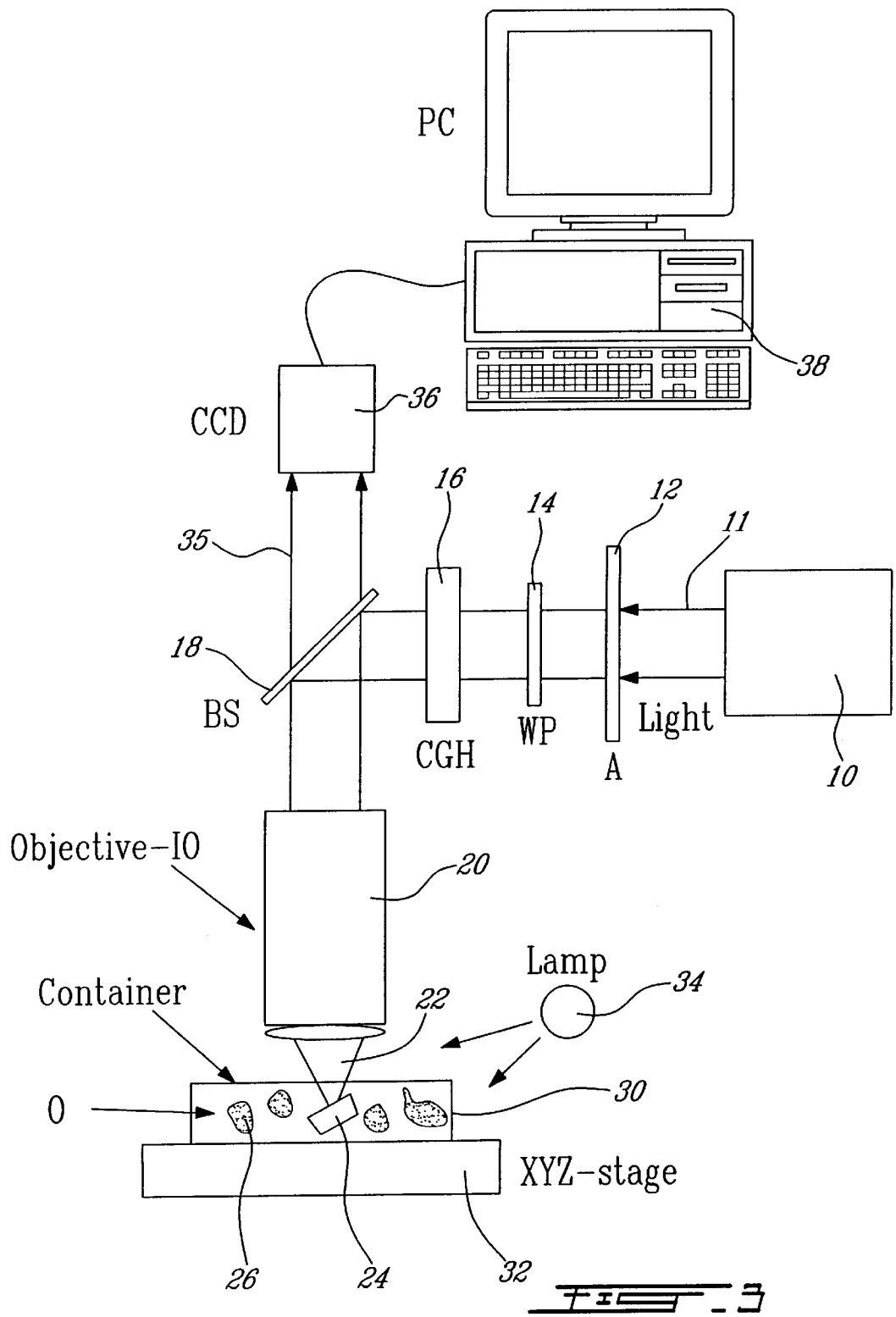
FIG. 3 is a schematic diagram illustrating the apparatus according to the preferred embodiment.

As illustrated in FIG. 3, the optical trapping and rotating micro mixer according to the preferred embodiment comprises the following elements. A light source 10 such as an argon laser provides a beam of light 11. Alternatively, the light source 10 could comprise laser light from a diode laser.

A variable attenuator 12 is used to control the input photon number. A quarter wave plate 14 is provided on a rotational stage and the quater wave plate 14 is made of a transparent anisotropic plate which changes the polarization state of the light, i.e. the spin S. The orientation of the optical axis of the quater wave plate 14 defines the spin S of the photons passing through it. Therefore, by means of a reorientation of the plate 14, control of the total spin of the input light and correspondingly of the rotation rate of the micro object can be achieved.

In the preferred embodiment, a computer generated hologram (CGH) is included to transform the input beam intensity distribution for two purposes. Firstly, the optimal trapping beam shape is determined, for example, the G or D forms. Secondly, it is possible to introduce additional orbital angular momentum L of the light beam using the computer generated hologram. As can be appreciated, the addition of the computer generated hologram 16 is optional in the case that the micro objects are to be only rotated using the spin S angular momentum of the light beam.

In the preferred embodiment, the light emitted from the laser and passing through the elements 12, 14 and 16 is directed to the micro objects via a beam splitter 18 and a microscope objective lens 20 for the purposes of allowing imaging of the micro objects during manipulation as will be described in greater detail hereinbelow. The beam reflected from beam splitter 18 passes through the objective 20 and forms a focused beam 22 which is directed onto the micro objects 24 and 26 contained within a container 30 and supported on a mobile stage 32.

The imaging optics 20 may be used in particular cases for an additional control of the driving light intensity distribution. The container 30 in which the micro objects are contained in place on the microscope XYZ stage 32 to allow for spatial shifts and lifting to be carried out. Of course, it is possible to move the beam 22 with respect to a fixed container and stage.

An illumination light source such as a white light lamp 34 is provided to allow for imaging the micro objects using the microscope imaging optics 20. The lamp 34 may comprise conventional microscope light sources such as axial or ring lighting rather than the side lamp as illustrated in FIG. 3. The illumination light from lamp 34 illuminates the micro objects 24 and 26 in container 30 and image light is collected by the imaging optics 20 and returned through beam splitter 18 as image light 35 to a camera 36 for display on a computerized display 38. In the preferred embodiment illustrated in FIG. 3, manual control of the quater wave plate 14 is used to control the induced rate of rotation of the micro objects 24 and 26. The movements of the XY stage 32, the transmission of the attenuator 12, the orientation of the quater wave plate 14, as well as the computer generated hologram 16 may be controlled by a control system in real time from the personal computer 38, in an automated mode of operation.

For the purposes of illustration in FIG. 3, two types of micro objects are shown in the same container 30. The first type of micro object is the micro object 24 which is a substantially transparent anisotropic micro half wave plate. Such a microscopic half wave plate may be easily manufactured, for example, from broken parts during the manufacture of a half wave plate for macroscopic needs. Ideally, it should have two parallel surfaces, cut in the form of an ellipse, and the optical axis should be parallel to the two planar faces of the microplate 24. Other geometrical forms may also be used. The micro object 24 can be placed in the container 30 along with other microscopic objects whose position and orientation is to be controlled by the micro objects 24. The other microscopic objects are typically isotropic and transparent, meaning that they cannot easily be manipulated and rotated by light. The embedding of the half wave micro plate 24 within the container, as well as the positioning and orientation of the micro plate 24 is achieved all optically. Once the plate is put into the desired position, it can be used to shift and "reorient" other micro particles, or it can be used as a microscopic mixer.

For naturally anisotropic micro objects 26, the micro objects are directly manipulated by the light beam 22. One example of a naturally anisotropic micro object is a biological cell membrane which is formed by an oriented liquid crystalline molecular bilayer. In this case, the apparatus illustrated in FIG. 3 can be used to trap the desired particle, shift it and reorientate it, and even to rotate the micro object 26 with a controlled rate as in a mixer. The rotation rate of the micro object 24 or 26, may be all optically controlled and allow for the acceleration, deceleration, stopping and reversal of the micro object. Generally, the rotation rate depends on the number of photons (intensity), the spin S and the "orbital" angular momentum L of the beam. These parameters are controlled respectively by means of elements 12, 14 and 16. The apparatus illustrated in FIG. 3 allows single beam trapping to be combined with the transfer of the angular momentum (both spin and orbital) of the light to the micro object. The relative efficiency of the trapping and rotation changes for different objects. In the case of absorbing micro objects, the apparatus of FIG. 3 may also be used, however, the efficiency of the transfer of the spin angular momentum S is one half.

Figure 4:
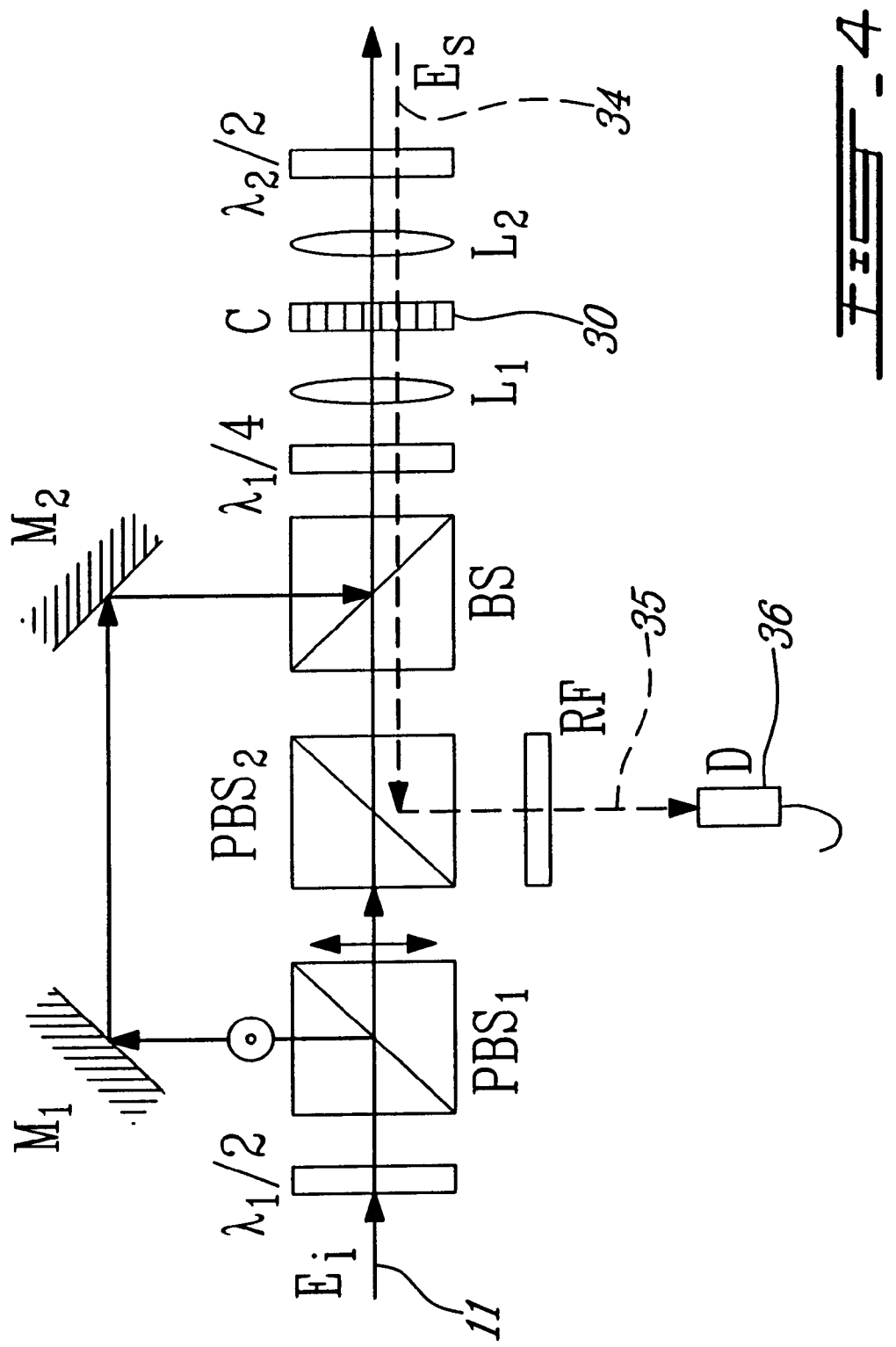
FIG. 4 illustrates schematically an apparatus according to an alternative embodiment in which spatial separation of two polarizations of the light with their further recombination is provided to obtain two co-propagating non-coherent beams forming an electromagnetic field with varied angular momentum while keeping at the same time its azimuthal symmetry.

Turning now to FIG. 4, an alternative optical setup according to an alternative embodiment will be described. Beam 11 is an argon ion laser beam (514 nm) which is linearly polarized by a half wave plate which is then separated by a polarized beam splitter $PBS_1$. The deviated beam is returned to the initial optical axis after reflection from mirrors M1 and M2, and the simple beam splitter BS. The optical path difference of these two arms exceeds the coherence length of the laser. Therefore, the obtained optical field is a mixture of two co-propagating non-coherent beams of orthogonal polarization. The intensity ratio, $R=I_1/I_2$, of these two beams is easily controlled by rotating the half wave plate $\lambda_1/2$.

To obtain an optical field compost of two beams with orthogonal non-coherent circular polarization, a quarter wave plate $\lambda_1/4$ (514 nm) is placed in the optical path of the recombined beam. The latter is then focused by the lens 1 having a focal length of 13 cm to a homeotropic liquid crystal cell C 30 having a thickness of 90 microns at normal incidence. The spot diameter in the liquid crystal cell is 80 microns. The nematic liquid crystal used is E7 from Merck Limited. The weak linearly polarized probe beam $E_s$ 34 of a helium neon laser is counter-propagating with respect to the excitation beams and is focused into the director perturbation area by lens 12 having a focal length of 10 cm. The probe beam is then collimated by the lens 11 and is reflected from the second polarization beam splitter $PBS_2$ away from the principal axis. The polarization plane of the probe beam is rotated by means of the second pathway plate $\lambda_2/2$ (632.8 nm). The noise or reflections of the excitation beams are cut off by a red filter RF. The polarization state of the output probe beam 35 is analyzed by means of the polarization beam splitter $PBS_2$ and the detector D36.

In this alternative embodiment illustrated in FIG. 4, the use of a nematic liquid crystal in container 30 as the micro objects to be rotated by the beam allows the rotational state and also the rate of rotation to be checked by using linearly polarized light in the probe beam 34. The intensity of light in the beam 35 will therefore be modulated based on the bulk angular orientation of the liquid crystal in container 30. Therefore, a simple detector can replace the CCD camera at 36 for the purposes of observing the effect of the light on the micro objects.

As can be appreciated, the arrangement of the first half wave plate, the polarized beam splitters $PBS_1$ and $PBS_2$, the mirrors $M_1$ and $M_2$ and the beam splitter BS could be used in the setup of FIG. 3 between the laser light source and the attenuator 12 to provide the advantage of two co-propagating non-coherent beams forming an electromagnetic field with varied angular momentum, keeping at the same time its azimuthal symmetry. This allows for the effective all optical control of the light angular momentum transfer to the quasi macroscopic ensemble of the precessing molecules as well as of the modulation of their rotation rate.

Although the invention has been described above with reference to a preferred embodiment and an alternative embodiment, it is to be understood that the above description is intended merely to illustrate the invention and not to limit the scope of the invention as defined in the appended claims.

What is claimed is:

1. A method of rotating a transparent anisotropic micro object, comprising the steps of:
    providing a container containing at least one transparent anisotropic micro object to be rotated;
    providing a beam of light having angular momentum;
    directing and controlling said beam to be transmitted through said micro obiect to cause rotation of said micro object in said container, said beam exiting said micro object having undergone a change in its angular momentum and having imparted angular momentum to said micro object.

2. The method as claimed in claim 1, wherein said beam of light is circularly polarized.

3. The method as claimed in claim 2, further comprising a step of adjusting a state of circular polarization of said beam so as to adjust a rate of rotation of said micro object.

4. The method as claimed in claim 1, wherein said beam of light has orbital angular momentum.

5. The method as claimed in claim 4, wherein said step of providing said beam further comprises providing a computer generated hologram for imparting said orbital angular momentum in said beam of light.

6. A method of micro-mixing a suspension or solution, comprising the steps of:
    providing a container containing said suspension or solution;
    providing at least one transparent anisotropic micro probe object in said suspension or solution;
    providing a beam of light having angular momentum;
    directing and controlling said beam to be transmitted through said micro obiect to cause rotation of said micro probe object in said container to induce mixing of said suspension or solution, said beam exiting said micro obiect having undergone a change in its angular momentum and having imparted angular momentum to said micro obiect.

7. The method as claimed in claim 6, wherein said beam of light is circularly polarized.

8. The method as claimed in claim 7, further comprising a step of adjusting a state of circular polarization of said beam so as to adjust a rate of rotation of said micro object.

9. The method as claimed in claim 6, wherein said beam of light has orbital angular momentum.

10. The method as claimed in claim 9, wherein said step of providing said beam further comprises providing a computer generated hologram for imparting said orbital angular momentum in said beam of light.

* * * * *